US007753776B2

(12) United States Patent
Okada

(10) Patent No.: US 7,753,776 B2
(45) Date of Patent: Jul. 13, 2010

(54) SLOT MACHINE AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 860 days.

(21) Appl. No.: 11/635,582

(22) Filed: Dec. 8, 2006

(65) Prior Publication Data

US 2008/0051177 A1 Feb. 28, 2008

Related U.S. Application Data

(60) Provisional application No. 60/840,445, filed on Aug. 28, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS 6,093,102 A 7/2000 Bennett
2002/0065124 A1 5/2002 Ainsworth
2006/0025222 A1 * 2/2006 Sekine ........................ 463/42
2007/0123331 A1 * 5/2007 Hishinuma et al. ............ 463/16

* cited by examiner

*Primary Examiner*—Ronald Laneau
(74) *Attorney, Agent, or Firm*—NDQ&M Watchstone LLP

(57) ABSTRACT

A slot machine according to the present invention comprises: a display to which a plurality of symbols are arranged; a BET switch that allows a BET input; an input switch that allows an input of a rank order of the symbols; and a controller, the controller accepting the input of the rank order from the input switch when a predetermined number or more of BETs are accepted from the BET switch, and generating a predetermined bonus if a quantitative order of the numbers of the respective symbols rearranged to the display is same as the rank order inputted from the input switch upon rearrangement of the plurality of symbols arranged to the display.

9 Claims, 12 Drawing Sheets

Fig. 3

| Symbol | Number of symbols displayed | | | |
|---|---|---|---|---|
| | 3 symbols | 4 symbols | 5 symbols | 6 symbols or more (※1) |
| CHERRY | 2 | 4 | 6 | m*(n-2) |
| BELL | 4 | 8 | 12 | |
| STRAWBERRY | 6 | 12 | 18 | |
| ORANGE | 8 | 16 | 24 | |
| PLUM | 10 | 20 | 30 | |
| BLUE 7 | 20 | 40 | 60 | |
| JACKPOT 7 | 40 | 80 | 120 | |
| APPLE | 50 | 100 | 200 | m*(n-2) |

※1 "m" is number of coins to be paid out when number of displayed symbols is three symbols
"n" is number of displayed symbols

Fig. 5

| | First column | Second column | Third column | Fourth column | Fifth column |
|---|---|---|---|---|---|
| Code No. | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

Fig. 9

| Prize | Establishment possibility (%) | Number of coin-out (※1) |
|---|---|---|
| APPLE | 0.5 | 50 |
| JACKPOT 7 | 0.5 | 30 |
| BLUE 7 | 0.8 | 10 |
| BELL | 1.1 | 8 |
| STRAWBERRY | 1.5 | 5 |
| PLUM | 1.8 | 4 |
| CHERRY | 3.0 | 2 |
| ORANGE | 7.5 | 1 |

※1: the number of coin-out per one coin-in

SLOT MACHINE AND PLAYING METHOD THEREOF

CROSS-REFERENCE TO RELATED APPLICATIONS

This application claims priority of U.S. Provisional Application No. 60/840,445 filed on Aug. 28, 2006. The contents of this application are incorporated herein by reference in their entirety.

BACKGROUND OF THE INVENTION

1. Field of the Invention

The present invention relates to a slot machine and a playing method thereof.

2. Discussion of the Background

In a conventional slot machine, if a player inserts game media such as coins or bills into an insertion slot of a slot machine and pushes a spin button, a plurality of symbols are displayed in a scrolling manner to a display provided on the front surface of a casing and, thereafter, the respective symbols are automatically stopped.

As such a slot machine, as disclosed in the specification of U.S. Pat. No. 6,093,102, for example, there exists a slot machine having a concept of a winning line such that when a combination of symbols rearranged on the winning line is a predetermined winning combination, a predetermined number of game media are paid out.

In addition, as such a slot machine, as disclosed in the specification of U.S. Pat. No. 6,604,999 and the specification of US 2002-0065124-A1, for example, there exists a slot machine in which, when a combination of symbols rearranged on a winning line is a predetermined winning combination, a predetermined number of game media are paid out, and regardless of the winning line, a predetermined number of game media are paid out according to the number of symbols, called scatter symbols, arranged to a display.

The present invention provides a slot machine and a playing method thereof which have entertainment characteristics which have not been offered by the aforementioned conventional art.

The contents of U.S. Pat. Nos. 6,093,102 and 6,604,999, and US 2002-0065124-A1 are incorporated herein by reference in their entirety.

SUMMARY OF THE INVENTION

A first aspect of the present invention provides a slot machine having the following configuration.

That is, the slot machine according to the first aspect of the present invention comprises: a display to which a plurality of symbols are arranged; a BET switch that allows a BET input; an input switch that allows an input of a rank order of the symbols; and a controller. The controller accepts the input of the rank order from the input switch when a predetermined number or more of BETs are accepted from the BET switch, and generates a predetermined bonus if a quantitative order of the numbers of the respective symbols rearranged to the display is same as the rank order inputted from the input switch when the controller determines to shift the game state to a bonus game.

A second aspect of the present invention provides a slot machine having the following configuration.

That is, the slot machine according to the second aspect of the present invention comprises: a display to which a plurality of symbols are arranged; a BET switch that allows a BET input; an input switch that allows an input of a rank order of the symbols; and a controller. The controller determines whether or not the game state shifts to a bonus game when a predetermined number or more of BETs are accepted from the BET switch, accepts the input of the rank order from the input switch when the controller determines to shift the game state to a bonus game, and generates a predetermined bonus if a quantitative order of the numbers of the respective symbols rearranged to the display is same as the rank order inputted from the input switch when the controller determines to shift the game state to a bonus game.

A third aspect of the present invention provides a slot machine having the following configuration.

That is, the slot machine according to the third aspect of the present invention comprises: a display to which a plurality of symbols are arranged; a BET switch that allows a BET input; an input switch that allows an input of a rank order of the symbols; and a controller. The controller determines whether or not the game state shifts to a bonus game when a predetermined number or more of BETs are accepted from the BET switch, accepts the input of the rank order from the input switch when the controller determines to shift the game state to a bonus game, rearranges the symbols in a descending order of the number of rearrangements to the display upon rearranging the plurality of symbols arranged to said display, and generates a predetermined bonus if a quantitative order of the numbers of the respective symbols rearranged to the display is same as the rank order inputted from the input switch when the plurality of symbols arranged to said display are rearranged.

A fourth aspect of the present invention provides a playing method of a slot machine having the following configuration.

That is, the playing method of a slot machine according to the fourth aspect of the present invention comprises a step of accepting an input of a rank order of symbols from an input switch that allows an input of the rank order when a predetermined number or more of BETs are accepted from a BET switch that allows a BET input. The above-mentioned playing method comprises a step of generating a predetermined bonus if a quantitative order of the numbers of the respective symbols rearranged to a display is same as the rank order inputted from the input switch when the plurality of symbols arranged to said display are rearranged.

A fifth aspect of the present invention provides a playing method of a slot machine having the following configuration.

That is, the playing method of a slot machine according to the fifth aspect of the present invention comprises a step of determining whether or not the game state shifts to a bonus game when a predetermined number or more of BETs are accepted from a BET switch that allows a BET input, and accepting an input of a rank order from an input switch upon determination to shift the game state to a bonus game. The above-mentioned playing method comprises a step of generating a predetermined bonus if a quantitative order of the numbers of the respective symbols rearranged to a display is same as the rank order inputted from the input switch when the plurality of symbols arranged to said display are rearranged.

A sixth aspect of the present invention provides a playing method of a slot machine having the following configuration.

That is, the playing method of a slot machine comprises a step of determining whether or not the game state shifts to a bonus game when a predetermined number or more of BETs are accepted from a BET switch that allows a BET input, and accepting an input of a rank order from an input switch upon determination to shift the game state to a bonus game. The above-mentioned playing method comprises a step of rearranging the symbols in a descending order of the number of rearrangements to a display upon rearranging the plurality of symbols arranged to said display. Furthermore, the playing method comprises a step of generating a predetermined bonus if a quantitative order of the numbers of the respective symbols rearranged to the display is same as the rank order inputted from the input switch when the plurality of symbols arranged to said display are rearranged.

BRIEF DESCRIPTION OF THE DRAWINGS

FIG. 3 is a diagram showing a relationship between prizes and the numbers of coin-outs in a bonus game;

FIG. 5 is a diagram showing symbols and code numbers of the respective symbols;

FIG. 9 is a diagram showing a relationship between prizes and the numbers of coin-outs.

DESCRIPTION OF THE EMBODIMENTS

Figure 1A:
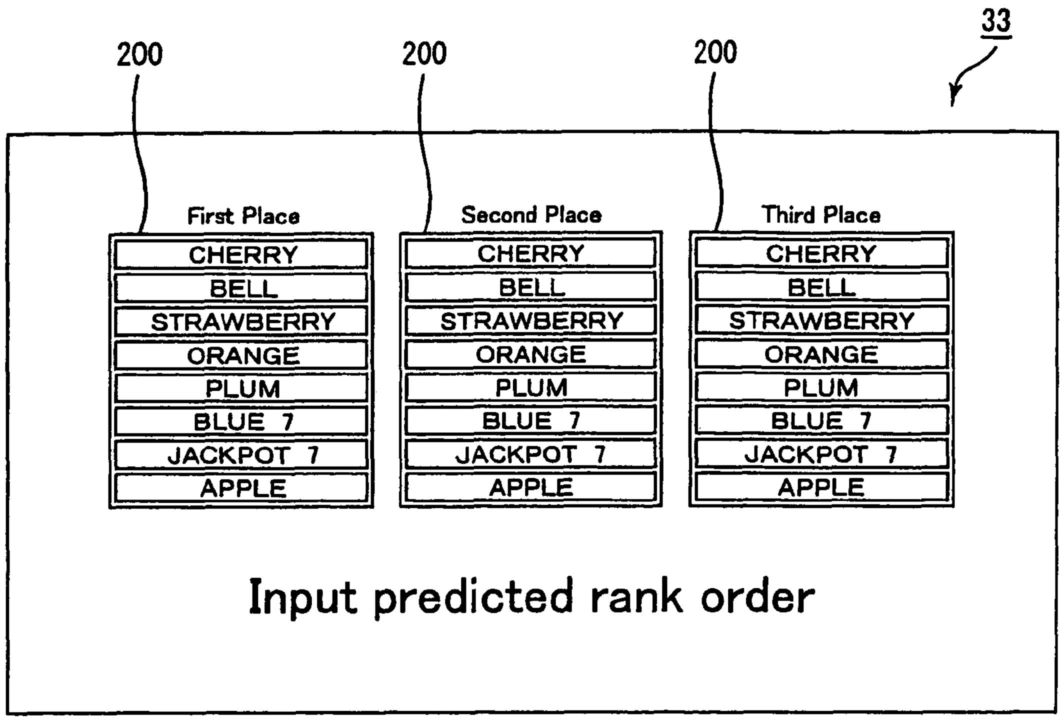
FIG. 1A is a diagram showing an exemplary image displayed when a rank order of symbols is inputted.
Figure 1B:
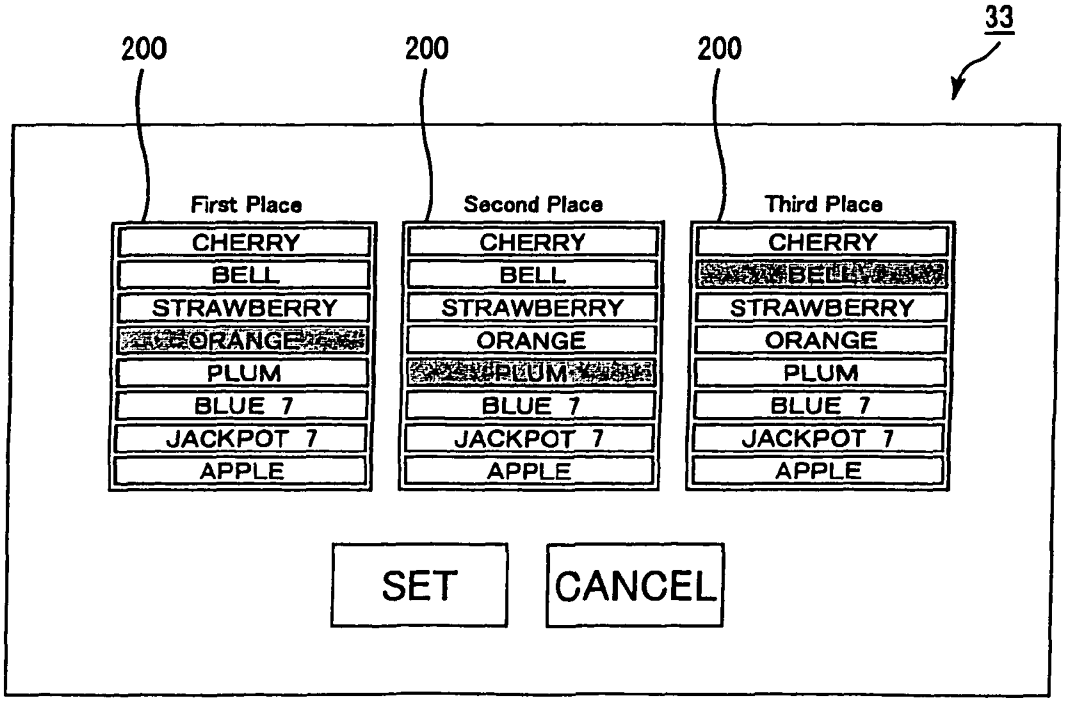
FIG. 1B is a diagram showing another exemplary image displayed when the rank order of the symbols is inputted.

FIGS. 1A and 1B are diagrams each showing an exemplary image displayed when the rank order of symbols is inputted. FIGS. 2A to 2E are diagrams each showing an exemplary symbol arrangement. FIG. 3 is a diagram showing a relationship between prizes and the numbers of coin-outs in a bonus game. Although a slot machine 10 is a standalone-type slot machine that is not connected to a network, the present invention can also be applied to a slot machine that is connected to a network.

A lower image display panel 16 included in the slot machine 10 of the present invention is composed of a liquid crystal panel. As shown in FIGS. 2A to 2E, fifteen display blocks 28 in five columns and three rows are displayed. In each display block 28, one symbol is arranged. In the present embodiment, any one of "CHERRY", "BELL", "STRAWBERRY", "ORANGE", "PLUM", "BLUE 7", "JACKPOT 7", and "APPLE" symbols is arranged in each display block 28.

When, upon the start of a game, MAX BET (50 coins in the present embodiment) is accepted from a 1-BET switch 26S or a maximum BET switch 27S, an image shown in FIG. 1A may be displayed to an upper image display panel 33.

When this image is displayed, a player can input the rank order of symbols. The rank order of symbols represents the quantitative order of the numbers of symbols displayed on the lower image display panel 16. For example, when seven of "ORANGE", four of "PLUM", two of "BELL", one "APPLE", and one "CHERRY" are arranged to the lower image display panel 16, the "ORANGE" is in first place, the "PLUM" is in second place, the "BELL" is in third place, and the "APPLE" and "CHERRY" are in fourth place. The player can predict and input the rank order of symbols in first to third places, which are to be rearranged in the next game.

At the bottom of the upper image display panel 33, an image indicating "Input predicted rank order" is displayed. At the center, rank order input images 200 for inputting the rank order of symbols are displayed in three columns. Each rank order input image 200 is constituted by an image having images "CHERRY", "BELL", "STRAWBERRY", "ORANGE", "PLUM", "BLUE 7", "JACKPOT 7", and "APPLE" displayed from the top to the bottom, in the described order. The left rank order input image 200 is an image for inputting a first-place symbol, the middle rank order input image 200 is an image for inputting a second-place symbol, and the right rank order input image 200 is an image for inputting a third-place symbol. A touch panel 69 is provided on a front face of the upper image display panel 33. The player can input the rank order of symbols by touching a corresponding position on the rank order input images 200. The touch panel 69 is equivalent to an input switch of the present invention.

For example, when the "ORANGE" is inputted for first place, the "PLUM" for second place, and the "BELL" for third place, an image shown in FIG. 1B is displayed. In the rank order input image 200 for first place, the color of the image of "ORANGE" is red. In the rank order input image 200 for second place, the color of the image of "PLUM" is red. In the rank order input image 200 for third place, the color of the image of "BELL" is red. At the bottom of the upper image display panel 33, an image indicating "set" and an image indicating "cancel" are displayed. When the image indicating "set" is selected, scrolling of symbols starts. On the other hand, when the image indicating "cancel" is selected, the image shown in FIG. 1A is displayed again.

Figure 2A:
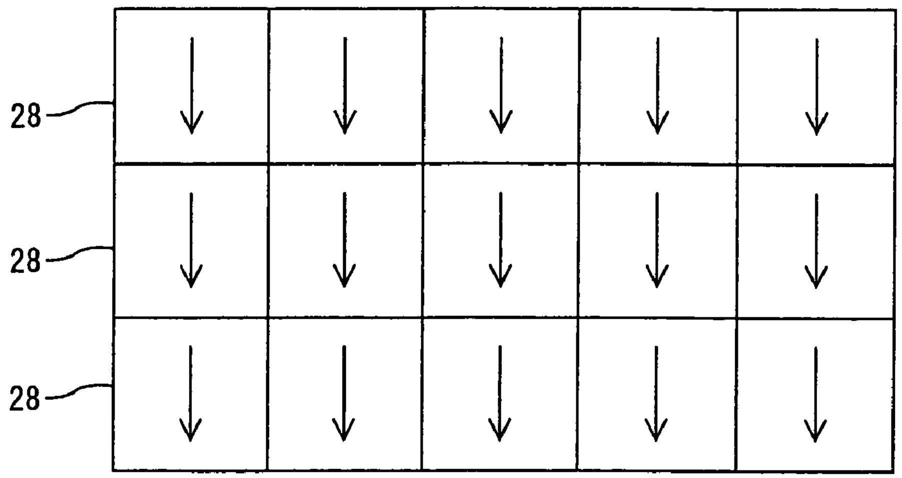
FIG. 2A is a diagram showing an exemplary symbol arrangement.
Figure 2B:
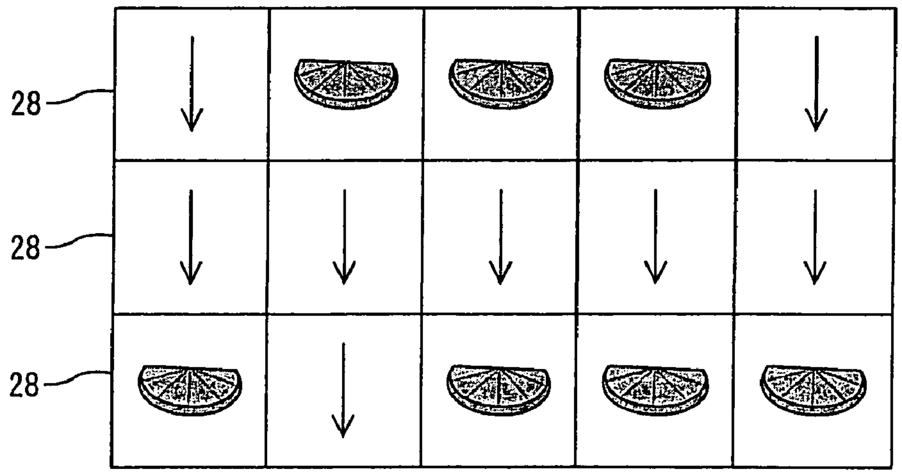
FIG. 2B is a diagram showing another exemplary symbol arrangement.

Once scrolling of symbols has started (see FIG. 2A), first, symbols having the highest number of arrangements to the lower image display panel 16 are rearranged. FIG. 2B shows a state in which only "ORANGE" that has the highest number of arrangements to the lower image display panel 16 is rear ranged. In the drawing, a downward arrow represents a symbol being scrolled.

Figure 2C:
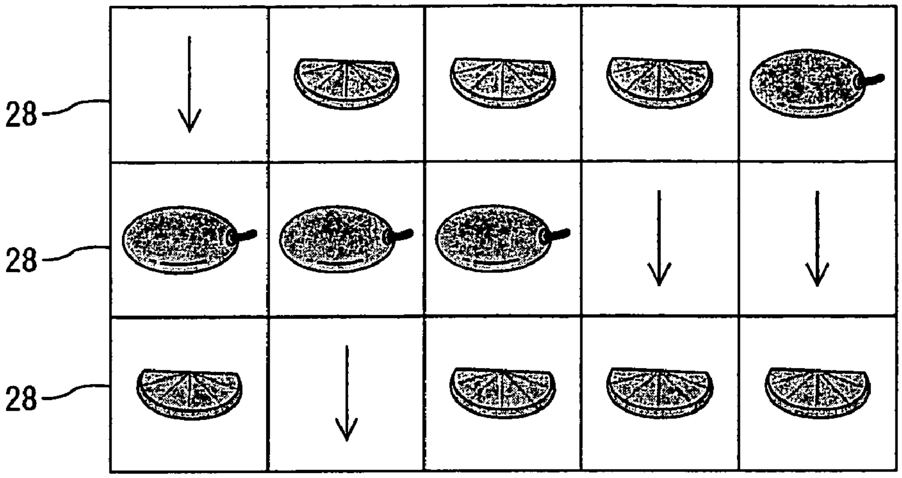
FIG. 2C is a diagram showing still another exemplary symbol arrangement.

Thereafter, symbols having the second highest number of arrangements to the lower image display panel 16 are rearranged. FIG. 2C shows a state in which "PLUM" that has the second highest number of arrangements to the lower image display panel 16 is rearranged.

Figure 2D:
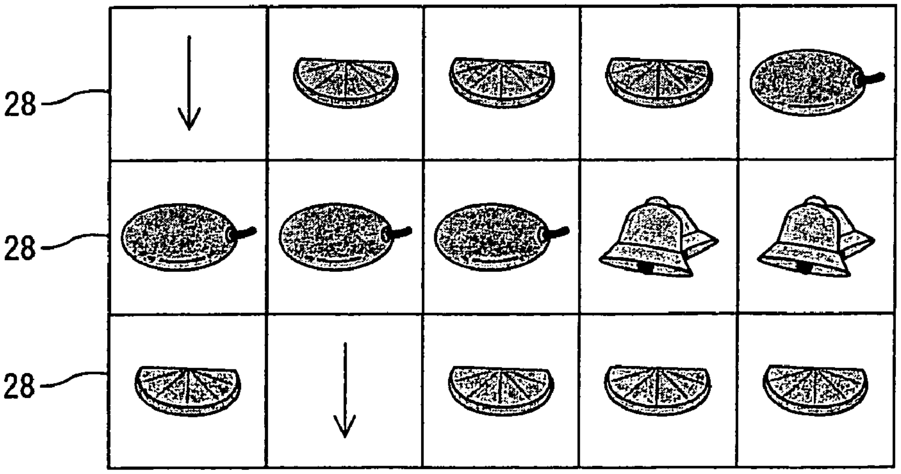
FIG. 2D is a diagram showing still another exemplary symbol arrangement.

Then, symbols having the third highest number of arrangements to the lower image display panel 16 are rearranged. FIG. 2D shows a state in which "BELL" that has the third highest number of arrangements to the lower image display panel 16 is rearranged.

Figure 2E:
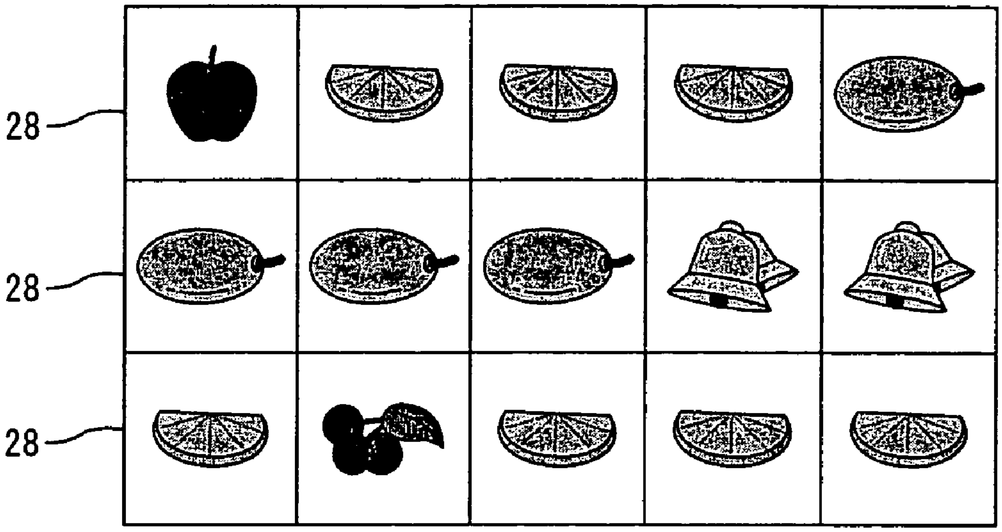
FIG. 2E is a diagram showing still another exemplary symbol arrangement.

Finally, other symbols are rearranged (see FIG. 2E).

Note that when the number of symbols of one type to be arranged is the same as that of another type, they may be rearranged simultaneously or may be assigned priorities of arrangements in advance.

As a result of a rearrangement of symbols, if the quantitative order of the numbers of symbols arranged to the lower image display panel 16 is the same as the rank order inputted through the touch panel 69, a predetermined number (e.g., 500) of coins are paid out as a bonus.

Note that in the present invention a bonus to be generated is not particularly limited; thus, it may be a free game that the player can play a predetermined number of times without putting a coin in or may be progressive jackpot payouts.

Furthermore, a payout of coins is conducted according to the number of each symbol arranged to the lower image display panel 16.

FIG. 3 is a diagram showing a relationship between prizes and the numbers of coin-outs in a bonus game.

When three or more symbols of one type, on which a rank-order input is made, are arranged to the lower image display panel 16, a predetermined number of coins shown in FIG. 3 are paid out. For example, when three of "CHERRY" are arranged, two coins are paid out, and when four of "CHERRY" are arranged, four coins are paid out. When six or more of "CHERRY" are arranged, 2× (n−2) coins are paid out. In this case, n represents the number of "CHERRY" arranged to the lower image display panel 16.

In the example shown in FIGS. 2A to 2E, seven of "ORANGE" and four of "PLUM" are arranged, and thus, 40 coins for the seven of "ORANGE" and 20 coins for the four of "PLUM", i.e., a total of 60 coins, are paid out in addition.

Although the present embodiment describes the case where a payout of coins is made according to the number of each symbol arranged to the lower image display panel 16, in the present invention, such a payout may not be made.

Although the above-described example describes the case where an input of the rank order of symbols can be accepted upon acceptance of MAX BET, the present invention is not limited to the case of MAX BET; for example, an input may be accepted when a preset or randomly set predetermined number or more of BETs are accepted.

Although the above-described example describes the case where the rank order of first to third places is inputted, in the present invention, it is not particularly limited thereto, and the rank order of first and second places may be inputted or the rank order of first to fourth places may be inputted. Alternatively, only one rank order, e.g., only first place or only second place, may be inputted.

Although the above-described example describes the case where the rank order of symbols is inputted through the touch panel 69, in the present invention, the input switch is not limited thereto and may be separately provided.

Although the above-described example describes the case where symbols are rearranged in descending order of the number of arrangements to the lower image display panel 16, the present invention is not limited to this example; for example, symbols of one type having the highest number of rearrangements may be rearranged at first and other symbols may be rearranged simultaneously or at random timing, or all symbols may be rearranged at random timing. When a configuration in which symbols are rearranged on a column-by-column basis is adopted, a mechanical reel on which a symbol sequence is drawn may be used.

Although the above-described example describes the case where a total of fifteen symbols in five columns and three rows are arranged, the embodiments of the present invention are not limited to five columns and three rows. Although the above-described example describes the case where symbols are displayed (arranged) to the lower image display panel 16 composed of a liquid crystal panel; the present invention is not limited thereto; for example, a mechanical reel may be arranged at a back face of a display (e.g., a transparent liquid crystal panel) and symbols may be arranged to the display using the mechanical reel. When a mechanical reel is used, by using mechanical reels of the same number as the number of symbols to be arranged to the display, the symbols can be scrolled individually.

Figure 4:
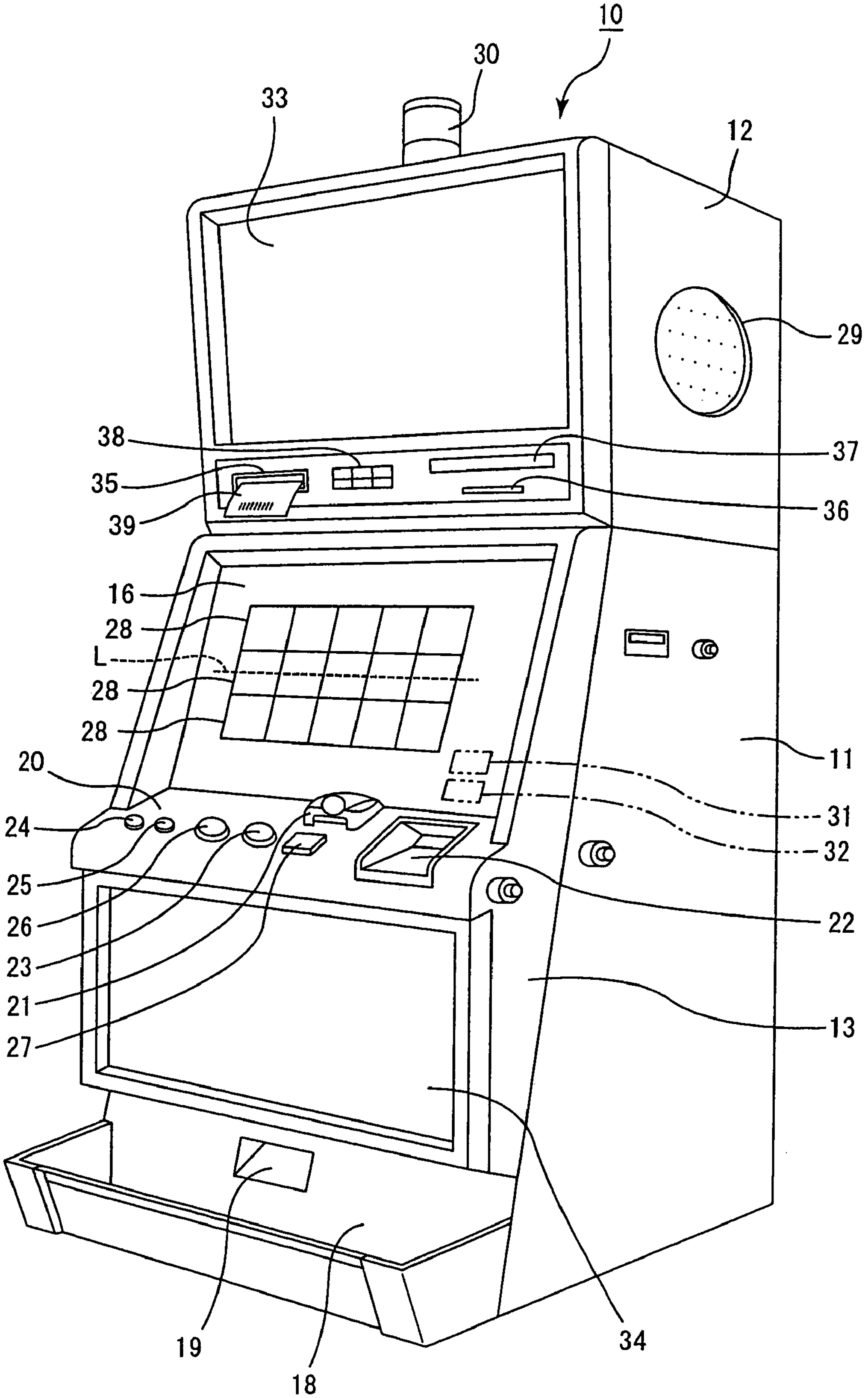
FIG. 4 is a perspective view showing an external appearance of a slot machine according to one embodiment of the present invention.

FIG. 4 is a perspective view schematically showing a flame format of a slot machine according to one embodiment of the present invention.

In the slot machine 10, a coin, a note or an electronic valuable information corresponding thereto is used as a game media. In the present invention, however, the game media is not particularly limited, and for example, a medal, a token, an electronic money and a ticket can be used. The ticket is not particularly limited and may include, for example, a ticket with a bar code as described later, and of the like tickets.

The slot machine 10 includes: a cabinet 11; a top box 12 placed on the upper side of the cabinet 11; and a main door 13 provided at the front face of the cabinet 11.

The lower image display panel 16 as a display is provided at the front of the main door 13. The lower image display panel 16 is provided with a liquid crystal panel and fifteen display blocks 28 in five columns and three rows are displayed. In each display block 28, one symbol is arranged.

One winning line L that horizontally crosses five display blocks 28 being displayed at the center of each column is formed on the lower image display panel 16. The winning line L defines a combination of symbols.

A number-of-credits display section 31 and a number-of-payouts display section 32 are provided on the lower image display panel 16. The number of credited coins is displayed as an image to the number-of-credits display section 31. The number of coins to be paid out when a combination of symbols arranged on the winning line L is a predetermined combination, is displayed as an image to the number-of-payouts display section 32.

Provided below the lower image display panel 16 are: a control panel 20 constituted by plural buttons 23 to 27 whose commands are associated with progress of the game are input by the player; a coin receiving slot 21 accepting coins into the cabinet 11; and a bill validator 22.

The control panel 20 is provided with: a spin button 23; a change button 24; a CASHOUT button 25; a 1-BET button 26; and a maximum BET button 27. The spin button 23 is used for inputting a command to start the scrolling of the symbols. The change button 24 is used in a case where a player requests an attendant of a recreation facility to exchange money. The CASHOUT button 25 is used for inputting a command to pay out credited coins to a coin tray 18.

The 1-BET button 26 is used for inputting a command to bet one coin of the credited coins. The maximum BET button 27 is used for inputting a command to bet the maximum number of coins that can be bet on one game (50 coins in the present embodiment) of the credited coins.

The bill validator 22 not only discriminates a true note from a false note, but also accepts the true note into the cabinet 11. The bill validator 22 may be configured such that a ticket 39 with a bar code which will be described later can be read. A belly glass 34 on which characters and the like of the slot machine 10 are depicted is provided on the front face of the lower portion of the main door 13, that is, below the control panel 20.

The upper image display panel 33 is provided at a front face of a top box 12. The upper image display panel 33 is provided with a liquid crystal panel and an image to introduce the contents of a game or to describe game rules, for example, is displayed thereon. Rank order input images 200 for inputting the rank order of symbols are displayed to the upper image display panel 33.

Moreover, though not shown in the figure, the touch panel 69 is provided at the front face of the upper image display panel 33 so that players can operate the touch panel 69 and input various commands.

A speaker 29 is provided in the top box 12. A ticket printer 35, a card reader 36, a data display 37 and a key pad 38 are provided beneath the upper image display panel 33. The ticket printer 35 prints on a ticket a bar code in which data such as the number of credits, date, time, identification number of the slot machine 10 and of the like data are encoded, and outputs the ticket 39 with a bar code. A player can make the ticket 39 with a bar code to be read by a second slot machine and play a game in the second slot machine, or exchange in a predetermined place (for example, at a cashier in the casino) of a recreation facility the ticket 39 with a bar code to notes and the like.

The card reader 36 is used for reading data from a smart card and writing data onto a smart card. The smart card is a card to be carried by a player, and for example, data to identify a player and data concerning a history of a game played by a player are stored thereon. Data corresponding to a coin, a note or a credit may also be stored on the smart card. As an alternative of a smart card, a magnetic stripe card may be adopted. The data display 37 is a fluorescent display and the like, and it is used, for example, to display data read by the card reader 36 and data input by a player from the key pad 38. The key pad 38 is used for inputting a command or data to issue a ticket and the like.

FIG. 5 is a diagram showing symbols and code numbers of the respective symbols.

As shown in FIG. 5, a total of 22 symbol sequences made up of code numbers of "00" to "21" are scrolled on the display blocks 28. Each symbol sequence is composed of a combination of any of "JACKPOT 7", "BLUE 7", "BELL", "CHERRY", "STRAWBERRY", "PLUM", "ORANGE", and "APPLE" symbols.

When five of any of "JACKPOT 7", "BLUE 7", "BELL", "CHERRY", "STRAWBERRY", "PLUM", "ORANGE", and "APPLE" symbols are rearranged on the winning line L, a predetermined number of coins are paid out (see FIG. 9).

When the 1-BET button 26 or the maximum BET button 27 is pressed, followed by the spin button 23 to start a game, symbols are scrolled downwardly from the upper position. Then, after a lapse of a predetermined period of time, the symbols are rearranged. Here, if a prize has been established, the player can receive a predetermined payout of coins (see FIG. 9).

Figure 6:
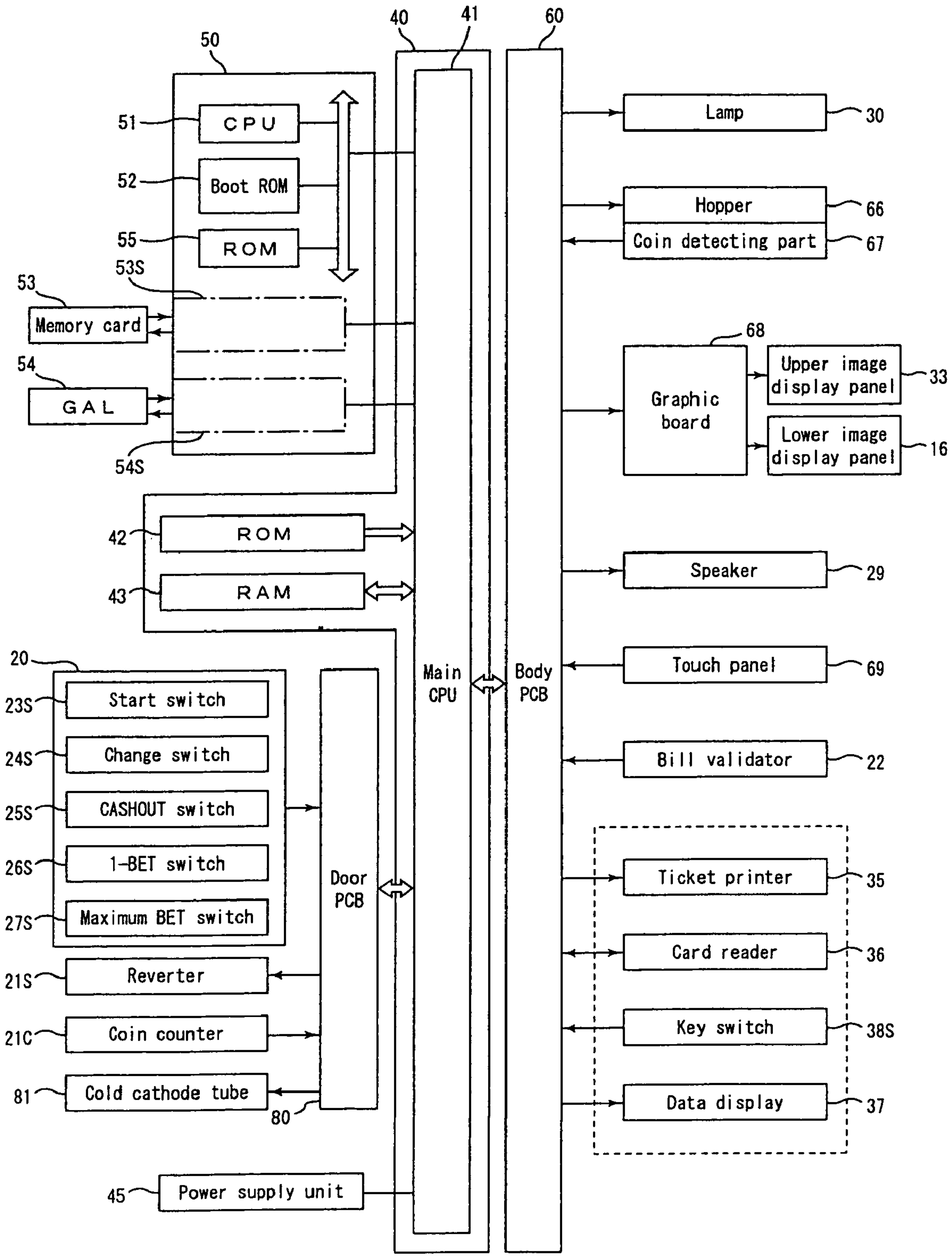
FIG. 6 is a block diagram showing an internal configuration of the slot machine shown in FIG. 4.

FIG. 6 is a block diagram showing the internal construction of the slot machine shown in FIG. 4.

A gaming board 50 includes: CPU (Central Processing Unit) 51, ROM 55 and boot ROM 52 which are interconnected to one another by an internal bus; a card slot 53S which accepts a memory card 53; an IC socket 54S which accepts GAL (Generic Array Logic) 54.

The memory card 53 is made of a non-volatile memory such as a CompactFlash (registered trademark) and stores a game program. The game program includes a symbol determination program. The symbol determination program is a program for determining symbols (code numbers corresponding to the symbols) to be arranged on the winning line L.

The card slot 53S is configured so that the memory card 53 can be inserted therein or drawn out therefrom, and connected to a mother board 40 through IDE bus. Therefore, a kind or contents of a game played in the slot machine 10 can be changed by drawing out the memory card 53 from the card slot 53S, writing a different game program thereon, and inserting the memory card 53 into the card slot 53S thereafter. The game program includes a program related to progress in a game. The game program further includes: image data and sound data output while a game is played.

CPU 51, ROM 55 and boot ROM 52 interconnected to each other by the internal bus are connected to the mother board 40 by PCI bus. The PCI bus not only conducts signal transmission between the mother board 40 and the gaming board 50, but also supplies electric power to the gaming board 50 from the mother board 40.

The mother board 40 is constructed with a general-purpose mother board commercially available (a printed circuit board on which basic parts of a personal computer are mounted) and includes: a main CPU 41; ROM (Read Only Memory) 42; RAM (Random Access Memory) 43 and a communication interface 44. The mother board 40 is the controller of the present invention.

ROM 42 is constituted of a memory device such as a flash memory and stores thereon a program such as BIOS (Basic Input/Output System) executed by the main CPU 41 and permanent data. When BIOS is executed by the main CPU 41, not only is an initialization processing for predetermined peripheral devices conducted, but a capture processing for the game program stored on the memory card 53 is also started via the gaming board 50. In the present invention, contents of ROM 42 may be rewritable or not rewritable.

RAM 43 stores data and a program used at the time of operation of the main CPU 41. RAM 43 can store the game program.

RAM 43 further stores data on the number of credits, the number of coin-in or coin-out for one game, and the like.

Both a body PCB (Printed Circuit Board) 60 and a door PCB 80 which will be described later are connected to the mother board 40 by USB. A power supply unit 45 is also connected to the mother board 40.

Equipment and devices which generate input signals to be input to the main CPU 41, and equipment and devices of which operations are controlled by a control signal output from the main CPU 41 are connected to the body PCB 60 and the door PCB 80. The main CPU 41 executes a game program stored in RAM 43 based of an input signal input to the main CPU 41, and thereby performs a predetermined computational processing, stores results of thereof into RAM 43 and transmits a control signal to each equipment and device as a control processing for each of the equipment and devices.

A lamp 30, a hopper 66, a coin detecting section 67, a graphic board 68, a speaker 29, a touch panel 69, a bill validator 22, a ticket printer 35, a card reader 36, a key switch 38S and a data display 37 are connected to the body PCB 60. The lamp 30 is lit up in a predetermined pattern based on a control signal output from the main CPU 41.

The hopper 66 is installed in the cabinet 11 and pays out a predetermined number of coins from a coin payout exit 19 to a coin tray 18 based on a control signal output from the main CPU 41. A coin detecting section 67 is installed inside the coin payout exit 19 and when detecting that a predetermined number of coins has been paid out from the coin payout exit 19, outputs an input signal to the main CPU 41.

The graphics board 68 controls image display on the upper image display panel 33 and the lower image display panel 16, based on a control signal output from the main CPU 41. Scrolled or rearranged symbols are displayed to the display blocks 28 of the lower image display panel 16. The number of credits stored in RAM 43 is displayed to the number-of-credits display section 31 of the lower image display panel 16. The number of coin-out is displayed to the number-of-payouts display section 31 of the lower image display panel 16.

The graphic board 68 is equipped with VDP (Video Display Processor) which generates image data based on a control signal output from the main CPU 41 and a video RAM which temporarily stores image data generated by VDP, and of the like equipments. Note that image data used in generating image data with VDP is read from the memory card 53 and contained in a game program stored in RAM 43.

The bill validator 22 not only discriminates a true note from a false note, but also accepts the true note into the cabinet 11. The bill validator 22, when accepting a true note, outputs an input signal to the main CPU 41 based on a face amount of the note. The main CPU 41 stores the number of credits corresponding to the amount of the note transmitted with the input signal.

The ticket printer 35, based on a control signal output from the main CPU 41, prints on a ticket a bar code obtained by encoding data such as the number of credits, date and time, the identification number of the slot machine 10, and of the like data stored in RAM 43, and outputs the ticket 39 with a bar code.

The card reader 36 transmits to the main CPU 41 data read from the smart card and writes data onto the smart card based on a control signal from the main CPU 41. The key switch 38S is provided on the key pad 38, and when the key pad 38 is operated by a player, outputs a predetermined input signal to the main CPU 41. The data display 37 displays, based on a control signal output from the main CPU 41, data read by the card reader 36 and data input by a player through the key pad 38.

The control panel 20, a reverter 21S, a coin counter 21C and a cold cathode tube 81 are connected to the door PCB 80. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. When the buttons 23 to 27 are operated by a player, each of the switches 23S to 27S corresponding thereto outputs input signals to the main CPU 41.

The coin counter 21C is installed inside the coin receiving slot 21, and discriminates whether a coin inserted by a player into the coin receiving slot 21 is true or false. Coins other than the true ones are discharged from the coin payout exit 19. The coin counter 21C also outputs an input signal to the main CPU 41 when a true coin is detected.

The reverter 21S operates based on a control signal output from the main CPU 41 and distributes coins recognized by the coin counter 21C as true coins into a cash box (not shown in the figure) or the hopper 66, which are disposed in the slot machine 10. In other words, when the hopper 66 is filled with coins, true coins are distributed in to the cash box by the reverter 24S. On the other hand, when the hopper 66 is not filled with coins, true coins are distributed into the hopper 66. The cold cathode tube 81 works as a backlight installed on the back face sides of the lower image display panel 16 and the upper image display panel 33 and is lit up based on a control signal output from the main CPU 41.

Next, description will be given of a processing performed in the slot machine 10.

The main CPU 41 reads and executes the game program to progress a game.

Figure 7:
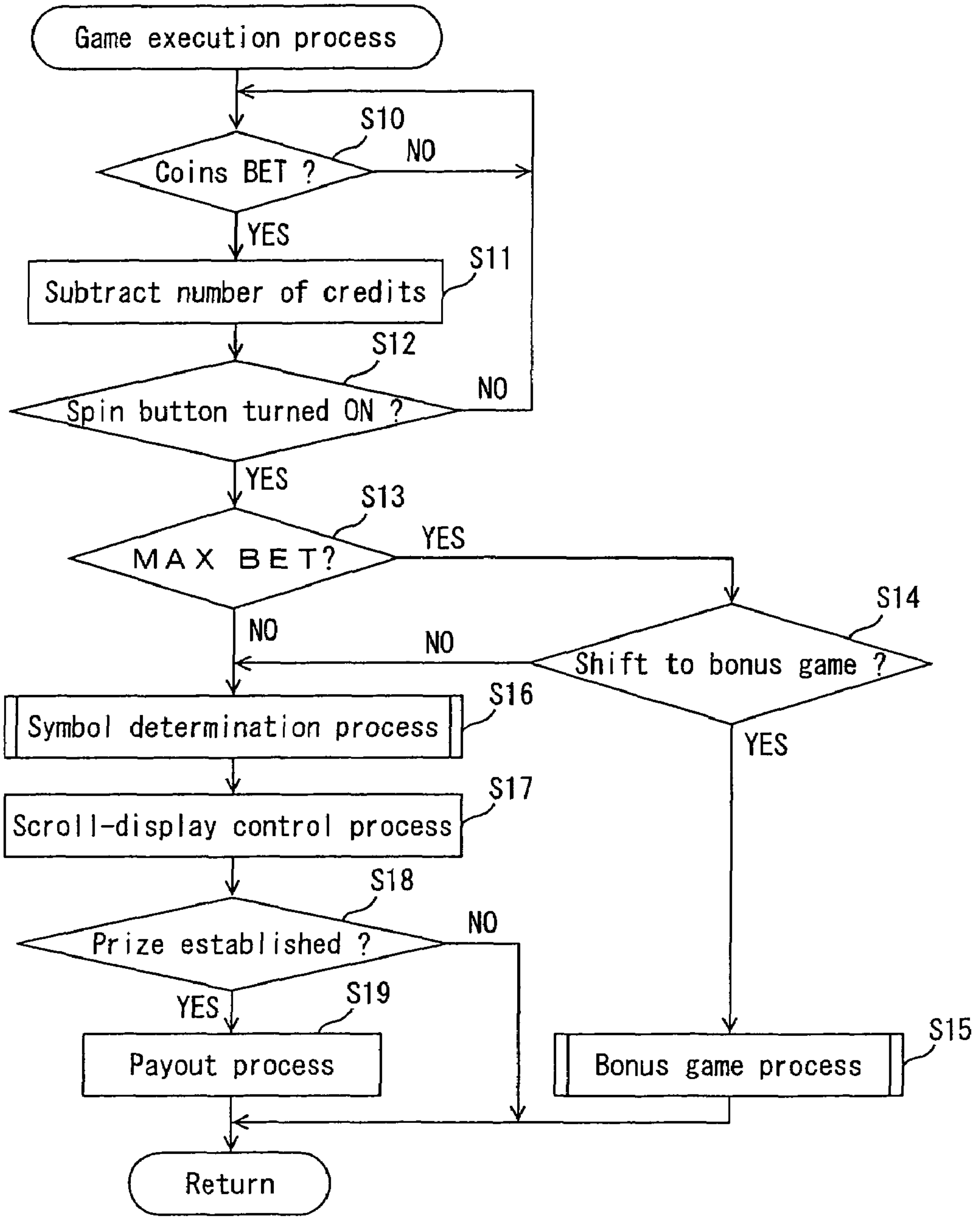
FIG. 7 is a flowchart showing a subroutine of a game execution process.

FIG. 7 is a flowchart showing a subroutine of a game execution processing.

In the game execution processing, the main CPU 41 at first determines whether or not a coin is BET (step S10). In the processing, the main CPU 41 determines whether an input signal output from the 1-BET switch 26S or the maximum BET switch 27S has been received or not when the 1-BET button 26 or the maximum BET button 27 is operated, respectively. If it is determined that a coin has not been BET, the process returns to step S10.

On the other hand, if it is determined in step S10 that a coin is BET, the main CPU 41 conducts a processing for subtracting the number of credits stored in RAM 43 according to the number of BET coins (step S11). In a case where the number of BET coins is more than the number of credits stored in RAM 43, the process returns to step S10 without conducting subtraction on the number of credits stored in RAM 43. In a case where the number of BET coins exceeds the upper limit (50 coins in the present embodiment) up to which a BET is possible in one game, the process advances to step S12 without conducting a processing for subtracting the number of BET coins from the number of credits stored in RAM 43.

At step S12, the main CPU 41 determines whether the spin button 23 has been turned ON or not. In the processing, the main CPU 41 determines whether an input signal output from the spin switch 23S has been received or not, when the spin button 23 is pressed.

If it is determined that the spin button 23 has not been turned ON, the process returns to step S10. Note that in a case where the spin button 23 has not been turned ON (for example, in a case where a command of terminating a game has been input without turning ON the spin button), the main CPU 41 cancels a result of the subtracting processing conducted in step S11.

If it is determined at step S12 that the spin button 23 has been turned ON, then the main CPU 41 determines whether or not it is MAX BET (step S13). If it is determined that it is MAX BET, then the main CPU 41 determines whether or not to shift to a bonus game (step S14). If it is determined to shift to a bonus game, then the main CPU 41 conducts a bonus game process (step S15) and ends the subroutine. The bonus game process will be described in detail later using FIG. 10.

If it is determined at step S13 that it is not MAX BET or it is determined at step S14 not to shift to a bonus game, the main CPU 41 conducts a symbol determination process (step S16). In the symbol determination process, the main CPU 41 executes a symbol determination program stored in the RAM 43 and thereby determines code numbers used at the time of stop of symbols. This process will be described in detail later using FIGS. 8 and 9. Although the present embodiment describes the case where one prize among a plurality of types of prizes is determined by determining symbols to be rearranged, in the present invention, for example, first, one prize selected from a plurality of types of prizes may be determined and then a combination of symbols to be rearranged may be determined based on the prize.

Subsequently, at step S17, the main CPU 41 conducts a scroll-display control process. This process is to control display such that after scrolling of symbols has started, a rearrangement is made with symbols determined at step S16.

The main CPU 41 then determines whether or not a prize has been established (step S18). If it is determined that a prize has been established, then the main CPU 41 pays out a number of coins according to the number of inserted coins and the prize (step S19) and ends the subroutine. On the other hand, if it is determined that no prize has been established, the main CPU 41 ends the subroutine.

Figure 8:
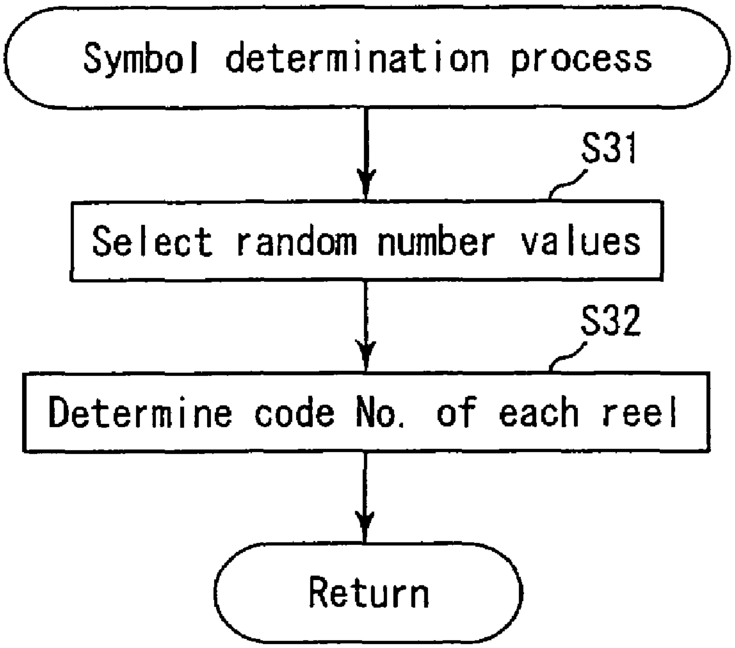
FIG. 8 is a flowchart showing a subroutine of a symbol determination process.

FIG. 8 is a flowchart showing a subroutine of the symbol determination process to be called and executed at step S16 of the subroutine shown in FIG. 7. This process is conducted by the main CPU 41 executing the symbol determination program stored in the RAM 43.

First, the main CPU 41 executes a random number generating program included in the symbol determination program and thereby selects random number values corresponding to symbols in each symbol sequence from a numeric value range between 0 to 255 (step S31). The present embodiment describes the case where random numbers are generated on the program (the case where so-called software random numbers are used). Note that, in the present invention, a random number generating circuit may be provided and random numbers may be extracted from the random number generating circuit (so-called hardware random numbers may be used).

The main CPU 41 then determines a code number (see FIG. 5) of each symbol sequence based on selected five random number values (step S32). The code number of a symbol sequence corresponds to the code number of symbols to be stopped and displayed on the winning line L. The main CPU 41 determines a code number of each symbol sequence and thereby determines a prize. For example, when the code numbers of symbols are determined to be "00", "00", "00", "00", and "00", it turns out that the main CPU 41 has determined that the prize is set to "JACKPOT 7".

Although in the present embodiment the scrolling of symbols is performed on a symbol-by-symbol basis, a rearrangement is made based on a symbol sequence. Specifically, upon scrolling, symbols are scrolled individually; however, when, for example, the code number of one symbol sequence is determined to be "10", the code numbers of symbols to be finally arranged to the lower image display panel 16 are "9", "10", and "11".

Now, prizes in the present embodiment will be described. FIG. 9 is a diagram showing a relationship between prizes and the numbers of coin-outs.

When five "APPLE" symbols are arranged on the winning line L, 50 coins per number of inserted coins are paid out. Similarly, when five of any of "JACKPOT 7", "BLUE 7", "BELL", "STRAWBERRY", "PLUM", "CHERRY", and "ORANGE" symbols are arranged on the winning line L, a number of coins according to the respective prizes are paid out.

Figure 10:
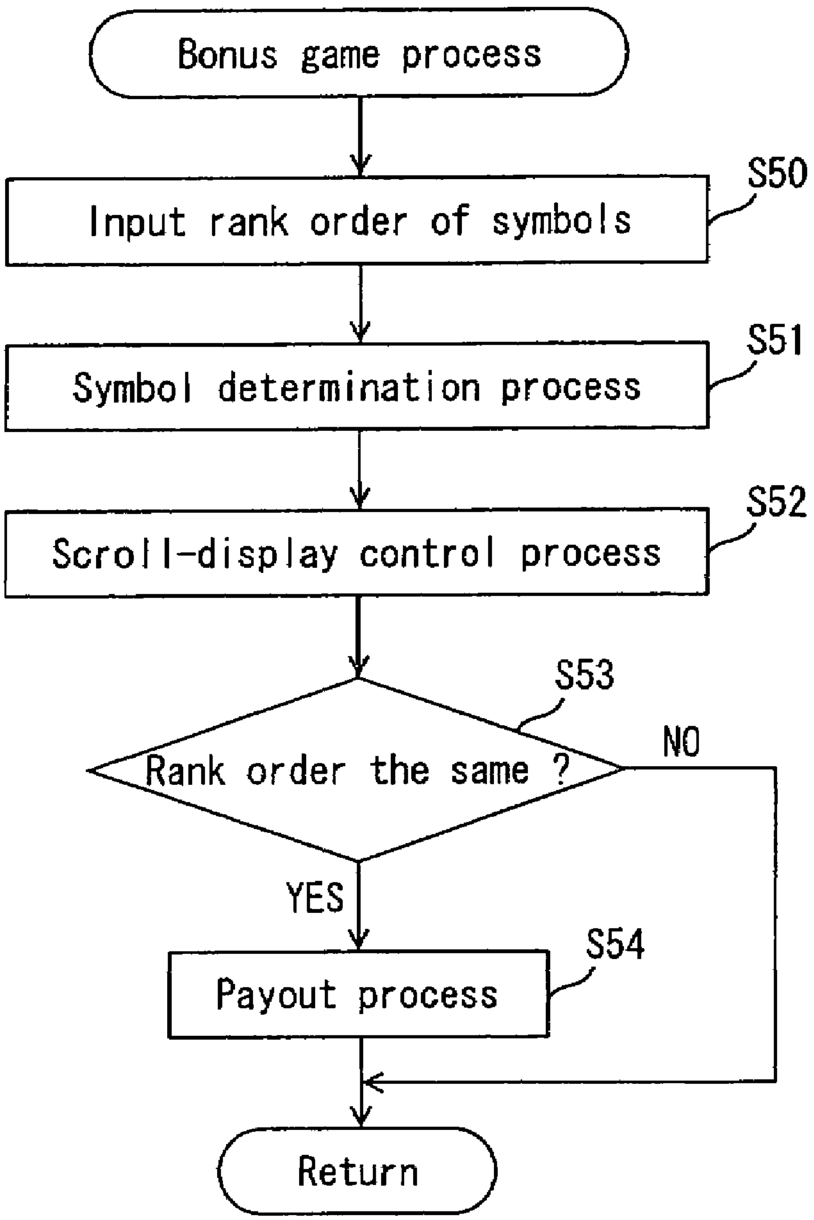
FIG. 10 is a flowchart showing a subroutine of a bonus game process.

FIG. 10 is a flowchart showing a subroutine of the bonus game process to be called and executed at step S15 of the subroutine shown in FIG. 7.

First, the main CPU 41 accepts an input of the rank order of symbols (step S50). At step S50, the player can predict and input the rank order of symbols in first to third places, which are to be rearranged in the next game (symbols to be rearranged at steps S51 and S52). At this time, the images shown in FIGS. 1A and 1B are displayed to the upper image display panel 33.

The main CPU 41 then performs a symbol determination process (step S51). The processing at step S51 is substantially the same as that described using FIG. 7. This process is already described and thus the description thereof will be omitted here.

Subsequently, the main CPU 41 conducts a scroll-display control process (step S52). In this process, the main CPU 41 counts the number of each symbol that has been determined at step S51 to be arranged to the lower image display panel 16. Then, after scrolling of symbols has started, as shown in FIGS. 2A to 2E, symbols are rearranged in descending order of the number of arrangements made to the lower image display panel 16.

The main CPU 41 determines whether the rank order of symbols inputted at step S50 is the same as the quantitative order (rank order) of the numbers of symbols rearranged on the lower image display panel 16 (step S53). If it is determined that the rank order is the same, then a predetermined number (e.g., 500) of coins are paid out as a bonus (step S54). After the operation at step S54, or at the time when is determined at step S53 that the rank order is not the same, the main CPU 41 ends the subroutine.

As described above, in the slot machine 10 and the playing method thereof according to the present embodiment, when MAX BET (a predetermined number or more of BETs) are accepted from the 1-BET switch 26S or the maximum BET switch 27S (BET switch), a determination as to whether or not to shift to a bonus game is made. If it is determined to shift to a bonus game, then an input of the rank order of symbols is accepted from the touch panel 69. When a plurality of symbols arranged to the lower image display panel 16 (display) are rearranged, the symbols are rearranged in descending order of the number of displays to the lower image display panel 16. When the plurality of symbols arranged to the lower image display panel 16 are rearranged, if the quantitative order of the numbers of symbols displayed to the lower image display panel 16 is the same as the rank order inputted from the touch panel 69, then a predetermined number (e.g., 500) of coins are paid out as a bonus.

Although the embodiment according to the present invention has been described, the description presents only some of the specific examples, and is not intended to limit the present invention in any way and specific constructions of each means and the like can be properly changed in terms of design. Besides, the effects described in the embodiment of the present invention are only the most preferable effects generated from the present invention and effects to be caused by the present invention is not limited to those described in the embodiment of the present invention.

There has thus been outlined, rather broadly, the more important features of the invention in order that the detailed description thereof aforementioned may be better understood, and in order that the present contribution to the art may be better appreciated. There are, of course, additional features of the invention that described above and which formed the subject matter of the claims appended hereto.

In this respect, above explaining at least one embodiment of the invention in detail, it is to be understood that the invention is not limited in its application to the details of construction and to the arrangements of the components set forth in the aforementioned description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

What is claimed as new and desired to be secured by Letters Patent of the United States is:

1. A slot machine comprising:

a display to which a plurality of symbols are arranged;

a BET switch that allows a BET input;

an input switch that allows an input of a rank order of the symbols; and a controller, said controller accepting the input of said rank order from said input switch when a predetermined number or more of BETs are accepted from said BET switch, and generating a predetermined bonus if a quantitative order of the numbers of the respective symbols rearranged to said display is the same as the rank order inputted from said input switch when the controller determines to shift the game state to a bonus game.

2. The slot machine according to claim 1, wherein said controller determines whether or not the game state shifts to a bonus game when the predetermined number or more of BETs are accepted from said BET switch, and accepts the input of said rank order from said input switch when the controller determines to shift the game state to a bonus game.

3. The slot machine according to claim 1, wherein said controller rearranges a symbol having the highest number of rearrangements to said display earlier than any other symbol among scrolled symbols, upon rearranging the plurality of symbols arranged to said display.

4. The slot machine according to claim 3, wherein said controller rearranges the symbols in a descending order of the number of rearrangements to said display.

5. The slot machine according to claim 1, wherein said controller pays out a game medium according to the number of each symbol rearranged to said display.

6. A slot machine comprising:

a display to which a plurality of symbols are arranged;

a BET switch that allows a BET input;

an input switch that allows an input of a rank order of the symbols; and a controller, said controller determining whether or not the game state shifts to a bonus game when a predetermined number or more of BETs are accepted from said BET switch, accepting the input of said rank order from said input switch when the controller determines to shift the game state to a bonus game, and generating a predetermined bonus if a quantitative order of the numbers of the respective symbols rearranged to said display is the same as the rank order inputted from said input switch when the controller determines to shift the game state to a bonus game.

7. The slot machine according to claim 6, wherein said controller rearranges a symbol having the highest number of rearrangements to said display earlier than any other symbol among scrolled symbols, upon rearranging the plurality of symbols arranged to said display.

8. The slot machine according to claim 7, wherein said controller rearranges the symbols in a descending order of the number of rearrangements to said display.

9. A slot machine comprising:

a display to which a plurality of symbols are arranged;

a BET switch that allows a BET input;

an input switch that allows an input of a rank order of the symbols; and a controller, said controller determining whether or not the game state shifts to a bonus game when a predetermined number or more of BETs are accepted from said BET switch, accepting the input of the rank order from said input switch when the controller determines to shift the game-state to a bonus game, rearranging the symbols in a descending order of the number of rearrangements to said display upon rearranging the plurality of symbols arranged to said display, and generating a predetermined bonus if a quantitative order of the numbers of the respective symbols rearranged to said display is the same as the rank order inputted from said input switch when the plurality of symbols arranged to said display are rearranged.

* * * * *